United States Patent [19]

Baston

[11] 4,362,220

[45] Dec. 7, 1982

[54] INDUSTRIAL TRUCK

[75] Inventor: Eric W. Baston, Warwickshire, England

[73] Assignee: Coventry Climax Limited, England

[21] Appl. No.: 154,606

[22] Filed: May 30, 1980

[30] Foreign Application Priority Data

Jun. 2, 1979 [GB] United Kingdom ................. 7919422

[51] Int. Cl.[3] ............................................. B62D 25/00

[52] U.S. Cl. .................................... 180/68.5; 280/756

[58] Field of Search ........................ 180/68.5; 280/756; 414/914; 296/102, 190

[56] References Cited

U.S. PATENT DOCUMENTS

| | | | |
|---|---|---|---|
| 3,275,092 | 9/1966 | Matthews | 180/68.5 |
| 3,536,353 | 10/1970 | Goodacre | 280/756 |
| 3,829,121 | 8/1974 | Ahrendt | 180/68.5 |
| 4,213,510 | 7/1980 | Wible | 180/68.5 |

FOREIGN PATENT DOCUMENTS

| | | | |
|---|---|---|---|
| 1197970 | 7/1970 | United Kingdom | 280/756 |

*Primary Examiner*—Joseph F. Peters, Jr.
*Assistant Examiner*—Ross Weaver
*Attorney, Agent, or Firm*—Thomas J. Greer, Jr.

[57] ABSTRACT

An industrial truck has an overhead guard made in two parts 7,8. The rear part 8 of the overhead guard is pivotable about the rear end of the truck to provide access to the vehicle battery box 4 from above so that the battery box can be lifted out from above via lifting eyes 14 to enable the batteries to be recharged. The battery 4 has a cover 5 which must also be pivoted to permit removal of the battery box. The battery box 4 is located against horizontal movement in the truck. In accordance with the invention, the battery box 4 has a projecting lug (not shown) which co-operates with the rear part of the overhead guard such as to prevent vertical movement of the battery box when the overhead guard is closed. Consequently, when the overhead guard is operative (that is, in its closed position), the battery box is positively located against movement relative to the truck in all directions and cannot fall out if the truck overturns.

4 Claims, 4 Drawing Figures

INDUSTRIAL TRUCK

This invention relates to industrial trucks, especially electric trucks.

The invention provides an industrial truck having an overhead guard which is pivotally connected to an end of the truck and at least part of which can be pivoted out of its operative position for access, and having a battery box which is located against horizontal movement relative to the truck, wherein the pivotable part of the overhead guard cooperates with the battery box to locate it against upward vertical movement relative to the truck when that part of the guard is in its operative position.

The arrangement of the invention ensures that the battery box is located in position provided the overhead guard is in its operative position and, generally, a truck cannot be operated until the overhead guard is in its operative position for safety reasons. Even if the truck topples over, the battery box is still maintained in position. Hitherto, the battery box was generally restrained against horizontal movement only and could thus fall out if the truck overturned. Although catches were sometimes provided, they could unintentionally be left unsecured.

Advantageously, the battery box has a cover which is pivotally mounted at the same end of the truck as that at which the overhead guard pivots, and which can be pivoted out of its operative position closing the battery box for access to the batteries. The cover ensures that individual batteries do not fall out of the battery box if the truck overturns. The cover is preferably pivotally mounted on the pivotable part of the overhead guard at one end of the cover, and preferably provided with catches for engaging the battery box at the other end of the cover.

Advantageously, the pivotable part of the overhead guard includes side arms which extend along the sides of the truck and a cross-piece joining the arms which extends along the said end of the truck via the cross-piece. Preferably, the cross-piece engages a lug projecting from the battery box.

An industrial truck constructed in accordance with the invention will now be described, by way of example, with reference to the accompanying drawings, in which.

Figure 1:
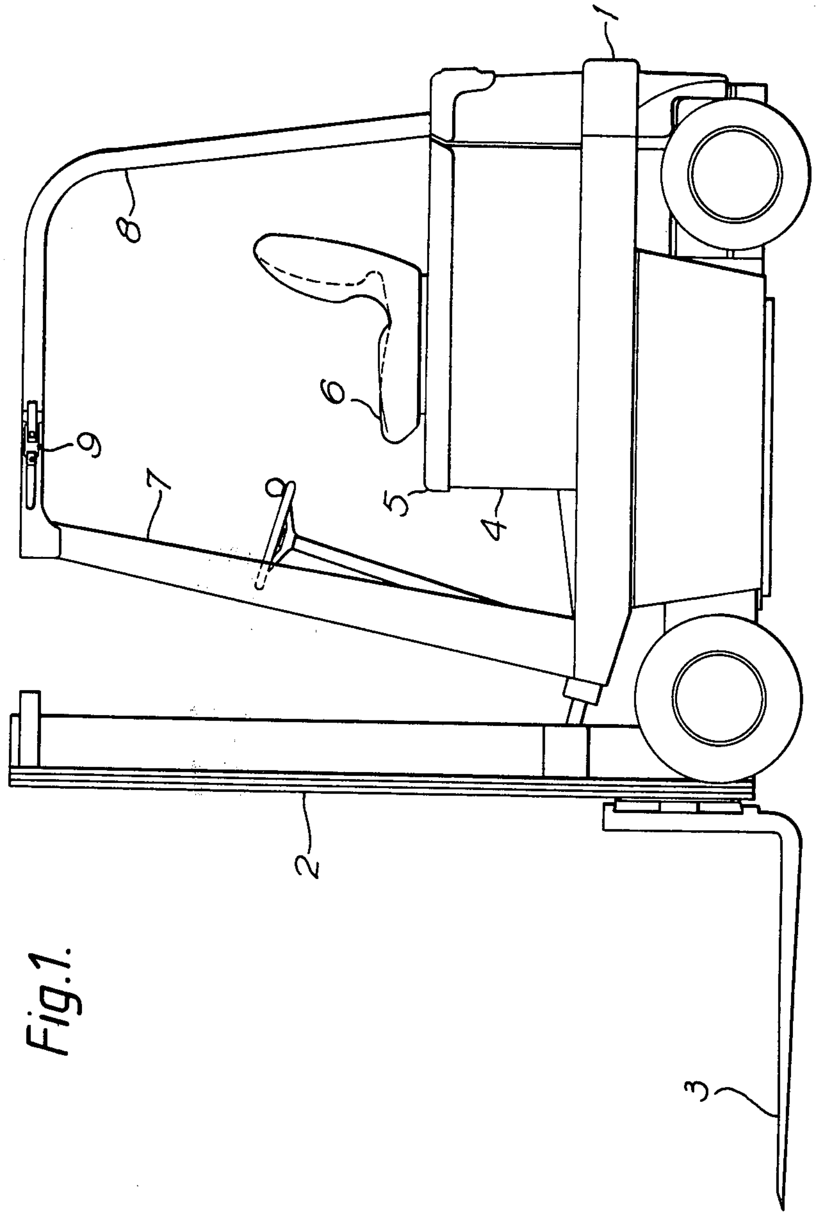
FIG. 1 is a side view of the truck with the overhead guard in its operative position.

Referring to the drawings, the truck, which is a counterbalanced fork lift truck, comprises a frame 1, a mast 2 and forks 3 movable up and down the mast. The truck is electrically powered, power being provided by batteries located in a battery box 4. A cover 5 closes the battery box and the driver's seat 6 is secured to the cover.

Figure 3:
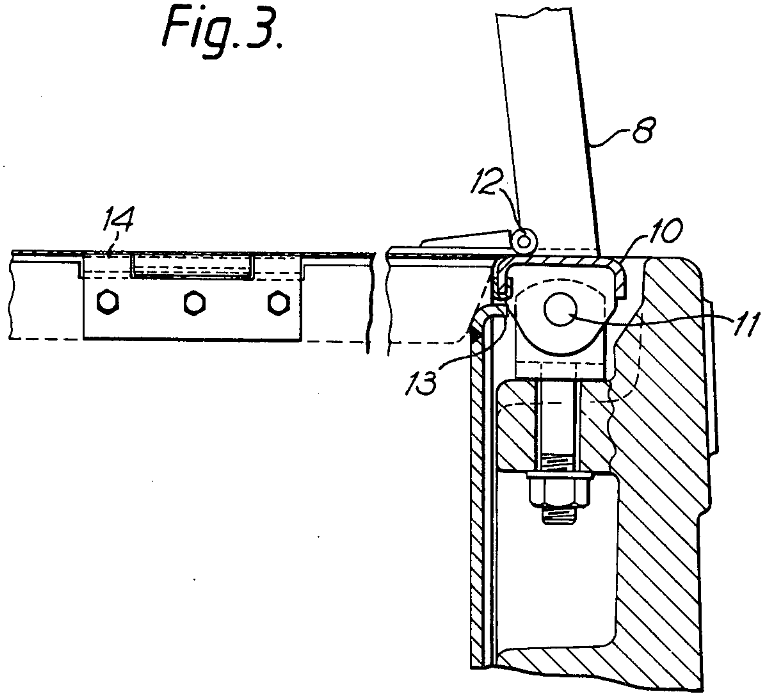
FIG. 3 is an enlarged view of a part of the truck corresponding to the view of FIG. 1.
Figure 4:
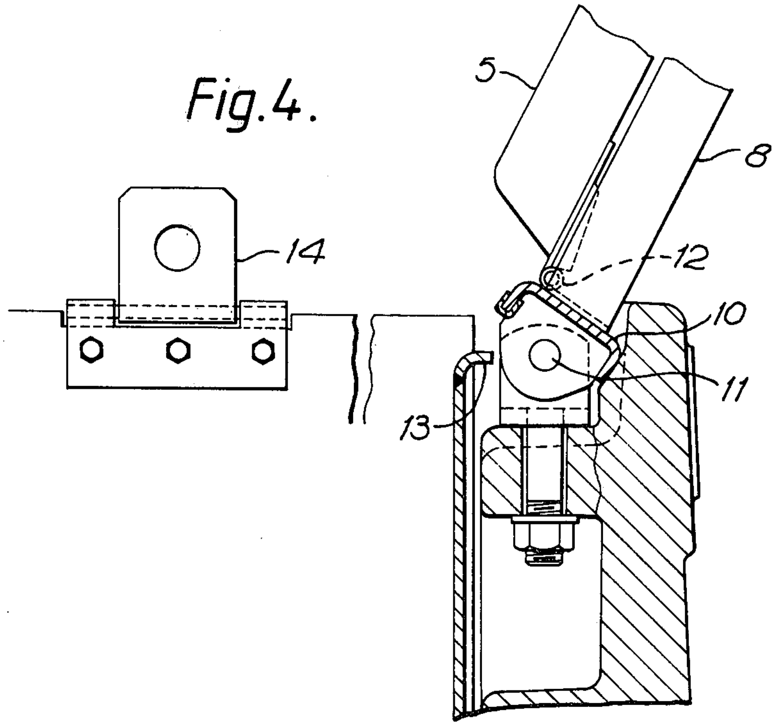
FIG. 4 is an enlarged view of the same part of the truck as shown in FIG. 3 but corresponding to the view of FIG. 2.

The truck has an overhead guard comprising a fixed front section 7 and a pivotable rear section 8, which are connected by latches 9, and each of which is in the form of an arm extending along the side of the truck (only one set being visible in the drawings). The arms are joined at the top by a roof structure. At the rear end of the truck, the pivotable sections of the arms are joined by an inverted channel-shaped cross-piece 10 (FIGS. 3 and 4). This is pivotally mounted about the axis 11 at the rear end of the truck.

The cover 5 of the battery box is pivotally mounted on the cross-piece 10 by means of a hinge 12. At the front, the cover is secured to the battery box by means of latches (not shown).

Figure 2:
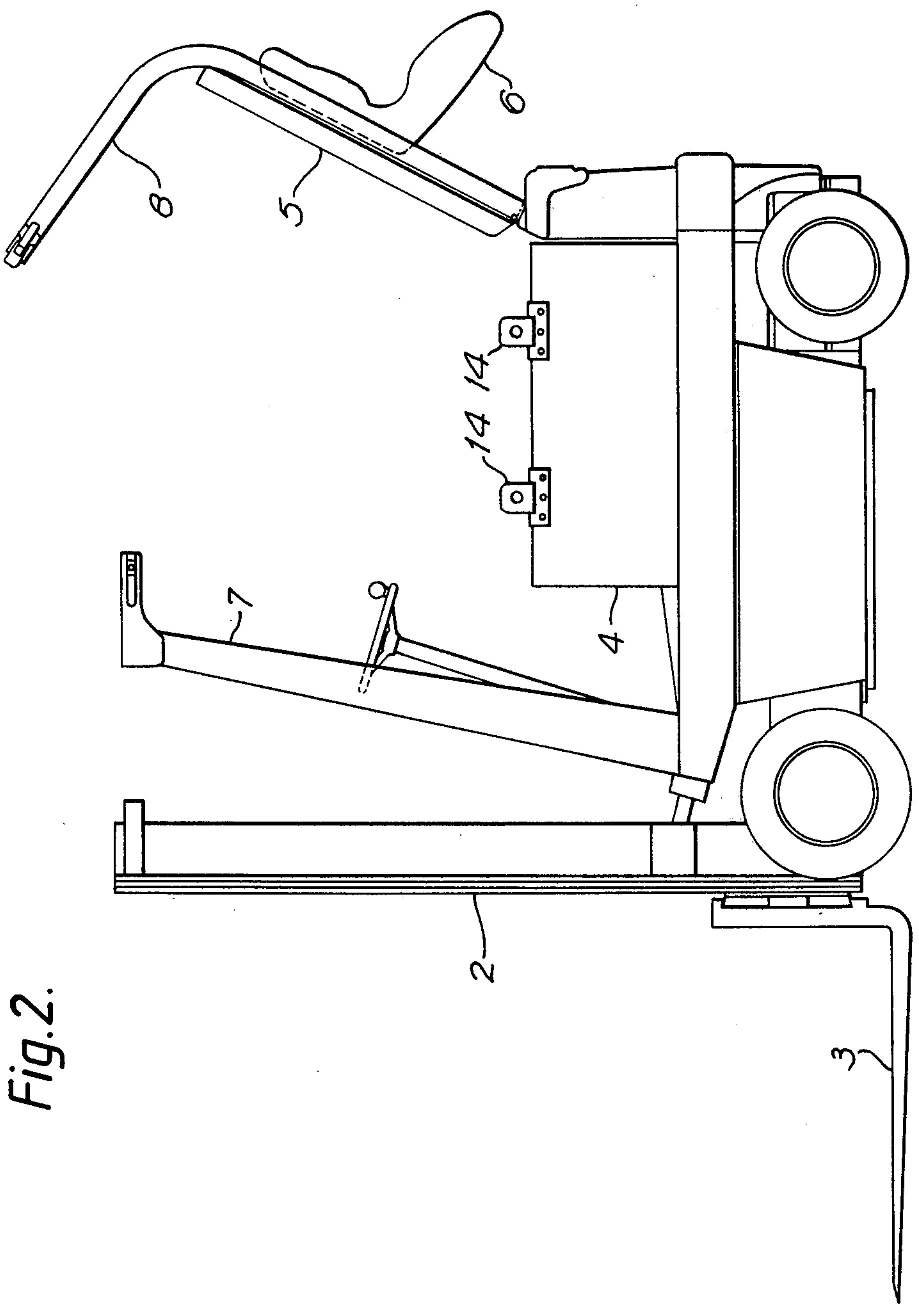
FIG. 2 is a side view of the truck with a part of the overhead guard pivoted rearwards.

Referring to FIGS. 1 and 2, the battery box 4 rests on a base in the frame 1 and the bottom region of the box is surrounded closely on all four sides to prevent lateral movement of the box. Referring to FIGS. 3 and 4, the box has, at its rear top end, a projecting lug 13 which lies below one of the limbs of the inverted channel-shaped cross-piece 10 and which is therefore prevented by the cross-piece 10 from moving vertically upwards. The battery box 4 is thus located against movement in all directions relative to the truck. It is to be noted that the box 4 cannot be removed by tilting the front end upwards to disengage the lug 13 from the cross-piece 10 because the bottom region of the box is surrounded closely, which only allows vertical movement of the box to take place.

In order to remove the battery box for recharging the batteries, the latches 9 are released and the rear section 8 of the overhead guard pivoted rearwards to the position shown in FIG. 2. The battery box cover 5 carrying the driver's seat is also pivoted rearwardly to the position shown in FIG. 2 and clips (by means which is not shown) to the rear section 8 of the overhead guard. The cross-piece 10 has now uncovered the lug 13, and so the battery can be lifted vertically by means of lifting eyes 14 hinged to the sides of the battery box.

The reverse procedure is adopted to refit the battery. It is to be noted that, as a safety feature, the industrial truck cannot be operated (because the electric supply is disabled) until the overhead guard is joined at the latches 9. However, this has the result that the truck also cannot be operated until the battery box has been secured in position. Hence it is not possible for the operator of the truck to overlook the securing of the battery box and still operate the truck.

The fact that the battery box is restrained means that it stays in position even if the truck topples over, the cover ensuring that none of the batteries can fall out. Hitherto, if a truck toppled over, the battery box and cover could fall on the operator.

I claim:

1. An industrial truck of the type including a battery box fixedly mounted against horizontal movement relative to the remainder of said truck but normally free for vertical movement, and an overhead guard for a truck operator; said truck being improved by said overhead guard including a part having a pivotal mounting for facilitating movement of said overhead guard part to an out of the way position relative to said battery box, and cooperating means on said overhead guard part and said battery box for locating said battery box against vertical movement when said overhead guard part is in an operative operator-guarding position and releasing said battery box when said overhead guard part is in said out of the way position, said battery box having a cover which is pivotally mounted at one end thereof on said overhead guard part and which can be pivoted out of an operative position in which said battery box is closed.

2. An industrial truck as claimed in claim 1, wherein the cover is provided with catches for engaging the battery box at the other end of the cover.

3. An industrial truck as claimed in claim 1 or 2, wherein the pivotable part of the overhead guard includes side arms which extend along the sides of the truck and a cross-piece joining the arms which extends along the said end of the truck.

4. An industrial truck as claimed in claim 3, wherein said cooperating means includes the cross-piece and a lug projecting from the battery box and engaged by said cross-piece.

* * * * *